United States Patent
Matsumoto et al.

(10) Patent No.: US 7,617,723 B2
(45) Date of Patent: Nov. 17, 2009

(54) THERMAL TYPE FLOW RATE MEASURING APPARATUS HAVING DECREASE IN COUPLING CAPACITANCE BETWEEN WIRING PORTIONS OF DETECTION ELEMENT

(75) Inventors: Masahiro Matsumoto, Hitachi (JP); Masamichi Yamada, Hitachinaka (JP); Hiroshi Nakano, Hitachi (JP); Keiji Hanzawa, Mito (JP); Yasuhiro Kanamaru, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/765,736

(22) Filed: Jun. 20, 2007

(65) Prior Publication Data

US 2008/0016958 A1    Jan. 24, 2008

(30) Foreign Application Priority Data

Jun. 21, 2006    (JP)    ............................. 2006-171594

(51) Int. Cl.
*G01F 1/68* (2006.01)
(52) U.S. Cl. .................................................. 73/204.26
(58) Field of Classification Search ............... 73/204.26
See application file for complete search history.

(56) References Cited

U.S. PATENT DOCUMENTS

| | | | | | |
|---|---|---|---|---|---|
| 5,291,781 | A | * | 3/1994 | Nagata et al. ............ 73/204.26 |
| 6,095,084 | A | * | 8/2000 | Shamouilian et al. .... 118/723 E |
| 6,194,678 | B1 | * | 2/2001 | Yoshikawa et al. .......... 200/512 |
| 6,432,812 | B1 | * | 8/2002 | May ............................ 438/619 |
| 6,470,742 | B1 | * | 10/2002 | Yamakawa et al. ....... 73/204.26 |
| 6,516,785 | B1 | * | 2/2003 | Nakada et al. ........... 73/204.26 |
| 6,981,411 | B2 | * | 1/2006 | Konzelmann et al. .... 73/204.26 |
| 7,137,298 | B2 | * | 11/2006 | Matsumoto et al. ...... 73/204.26 |
| 7,373,816 | B2 | * | 5/2008 | Strohrmann et al. ..... 73/204.26 |

FOREIGN PATENT DOCUMENTS

| | | |
|---|---|---|
| JP | 62-39722 | 2/1987 |
| JP | 2000-213973 | 8/2000 |
| JP | 2004-361271 | 12/2004 |

* cited by examiner

*Primary Examiner*—Harshad Patel
(74) *Attorney, Agent, or Firm*—Mattingly & Malur, PC (57) ABSTRACT

The coupling capacitance of the wiring portions of a thermal type flow rate measuring apparatus is reduced so as to prevent a drop in the response characteristics. A detection element of the thermal type flow rate measuring apparatus includes a planar substrate made of silicon, ceramic, or the like, in which a diaphragm is formed. On the surface of the diaphragm, there are disposed a heat-generating resistor as a heat-generating element that is heated to a predetermined temperature difference from the temperature of air flow to be measured, a heat-generating element temperature-detecting resistor for detecting the temperature of the heat-generating resistor, and temperature-detecting resistors disposed on both sides of the heat-generating resistor. The detection element also includes wiring portions which have connecting terminals electrically connected to the heat-generating resistor and a wiring pattern electrically connected with the surface of the planar substrate.

6 Claims, 7 Drawing Sheets

THERMAL TYPE FLOW RATE MEASURING APPARATUS HAVING DECREASE IN COUPLING CAPACITANCE BETWEEN WIRING PORTIONS OF DETECTION ELEMENT

BACKGROUND OF THE INVENTION

1. Field of the Invention

The present invention relates to thermal type flow rate measuring apparatuses and more particularly to a thermal type flow rate measuring apparatus capable of controlling the temperature of a heat-generating element at high speed.

2. Background Art

A conventional example of a thermal type flow rate measuring apparatus is shown in FIG. 19 of JP Published Patent Application 2004-361271 A. This flow rate measuring apparatus includes a planar substrate (silicon substrate) having a diaphragm on which a heat-generating element and temperature-detecting means for detecting the temperature on both sides of the heat-generating element are provided.

SUMMARY OF THE INVENTION

In such a thermal type flow rate measuring apparatus, where a heat-generating element and temperature-detecting means for detecting the temperature on both sides of the heat-generating element are provided on a diaphragm formed on a silicon substrate, there is the problem of coupling capacitance between the heat-generating element and the temperature-detecting means when the heat-generating element or the temperature-detecting means is pulse-driven In the above conventional example, this problem is dealt with by placing a shield pattern on the diaphragm.

Also, in such thermal type flow rate measuring apparatuses having a diaphragm formed on a silicon substrate, with a heat-generating element and temperature-detecting means for detecting the temperature on both sides of the heat-generating element provided on the diaphragm, the heat-generating element, its wiring portion, the temperature-detecting means, and its wiring portion are generally formed of the same film layer. In order to reduce the resistance values of the wiring portions, the pattern widths of the wiring portions are greatly increased as compared with the pattern widths of the heat-generating resistor and the temperature-detecting means. This, however, has resulted in the problem of a significance increase in the coupling capacitance between the wiring portions.

When the heat-generating element is pulse-driven, such coupling capacitance between the wiring portions causes the pulsed voltage for driving the heat-generating element to become superposed on the output voltage of the temperature-detecting means, thereby causing an error in the output of the temperature-detecting means. Similarly, when the temperature-detecting means is pulse-driven, an error is caused in the detection of the temperature of the heat-generating element. Furthermore, when detecting the temperature of the heat-generating element with a heat-generating element temperature-detecting means disposed near the heat-generating element, the coupling capacitance between the heat-generating element and the heat-generating element temperature-detecting means causes a drop in the response characteristics of temperature control of the heat-generating element.

In view of the aforementioned problems of the conventional art, it is an object of the invention to provide a highly accurate thermal type flow rate measuring apparatus by reducing: the coupling capacitance between the wiring portions of the heat-generating element, the temperature-detecting means, and the heat-generating element temperature-detecting means; the error in the output of the temperature-detecting means that is produced when the heat-generating element is pulse-driven; the error in the detection of the heat-generating element temperature when the temperature-detecting means is pulse-driven; and the drop in the response characteristics of temperature control of the heat-generating element that is caused when the temperature of the heat-generating element is detected by a heat-generating element temperature-detecting means disposed near the heat-generating element.

The above object is achieved by a thermal type flow detection element which comprises: a heat-generating element that generates heat when an electric current flows therethrough; temperature-detecting means disposed on both sides of the heat-generating element along the flow of a fluid; a heat-generating element connecting terminal electrically connected with the heat-generating element; and a temperature-detecting means connecting terminal electrically connected with the temperature-detecting means. A wiring pattern that is held at a predetermined potential is disposed between a heat-generating element wiring portion, which electrically connects the heat-generating element and the heat-generating element connecting terminal, and a temperature-detecting means wiring portion, which electrically connects the temperature-detecting means and the temperature-detecting means connecting terminal.

Effects of the Invention

In accordance with the invention, the capacitance between the wiring resistors of the thermal type flow rate measuring apparatus can be reduced, whereby a thermal type flow rate measuring apparatus having improved response characteristics and accuracy is provided.

DESCRIPTION OF A PREFERRED EMBODIMENT OF THE INVENTION

In the following, an embodiment of the invention is described with reference to the drawings.

Figure 1:
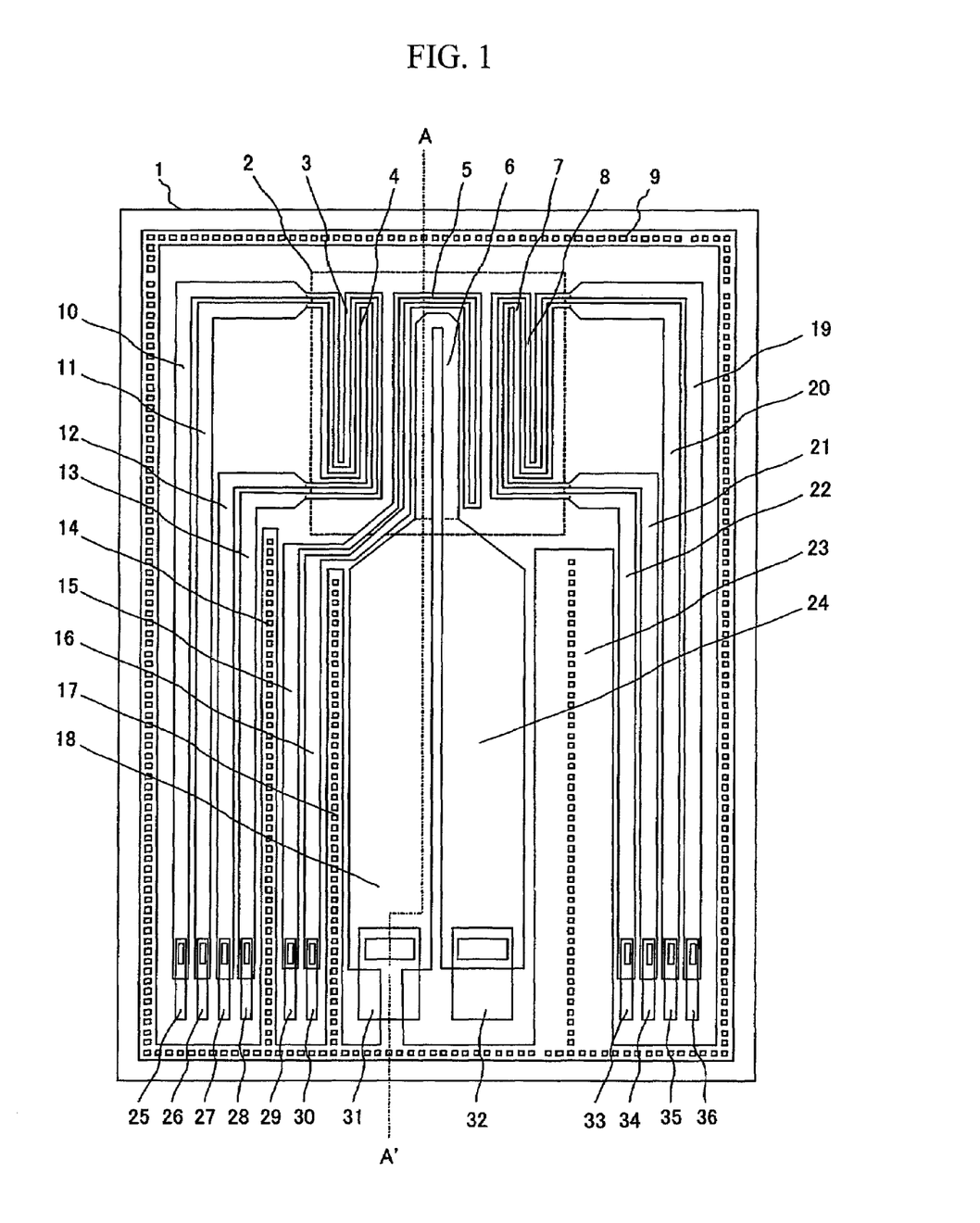
FIG. 1 shows a plan view of a detection element 1 of a thermal type flow rate measuring apparatus according to a first embodiment of the invention.
Figure 2:
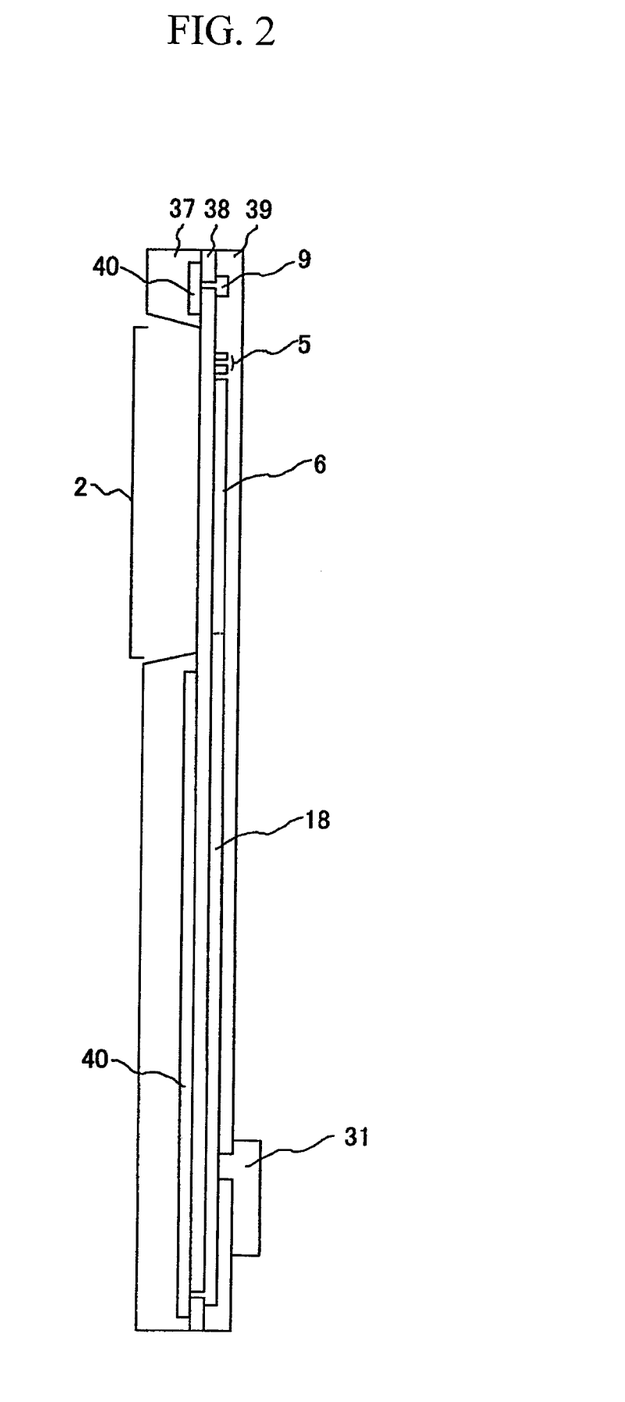
FIG. 2 shows a cross section taken along line A-A' of the detection element 1 of the thermal type flow rate measuring apparatus of the first embodiment.
Figure 3:
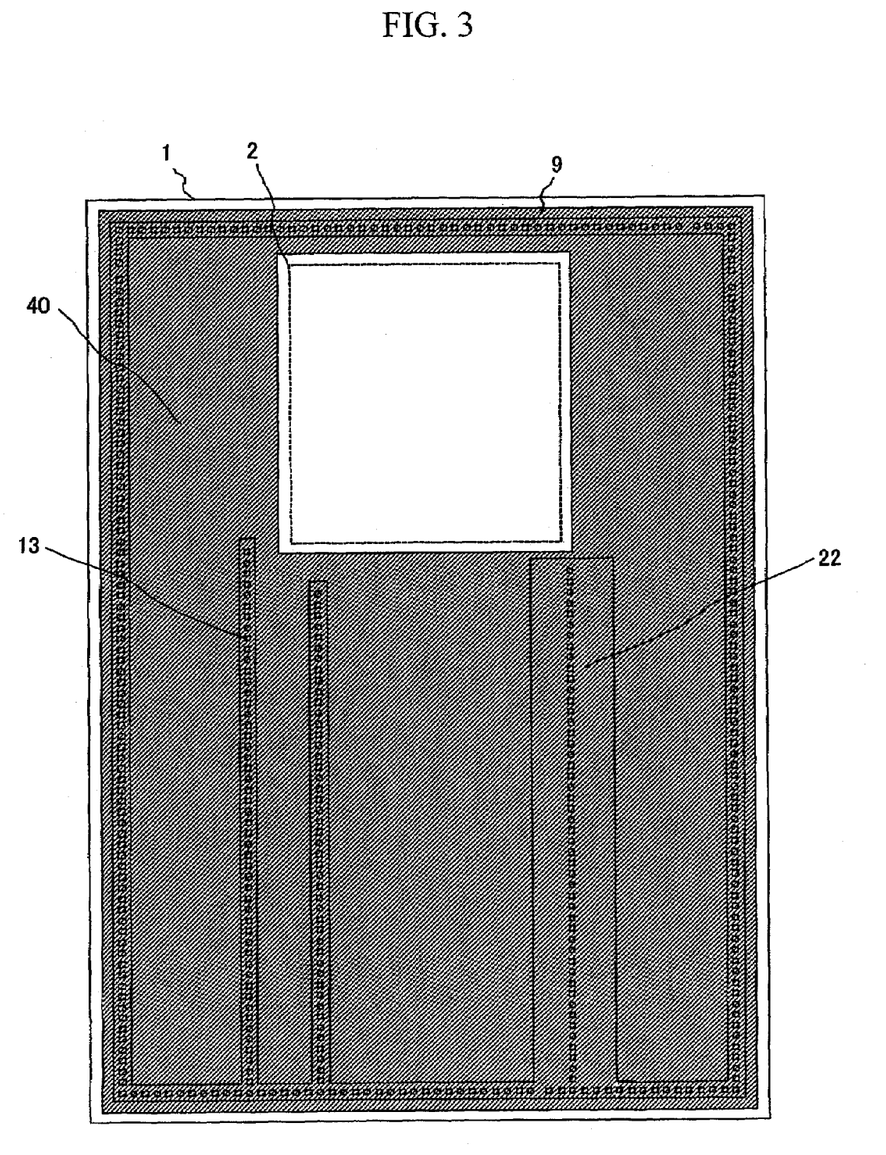
FIG. 3 shows a plan view showing the layout of a diffusion layer 40 in the detection element 1 of the thermal type flow rate measuring apparatus of the embodiment.
Figure 4:
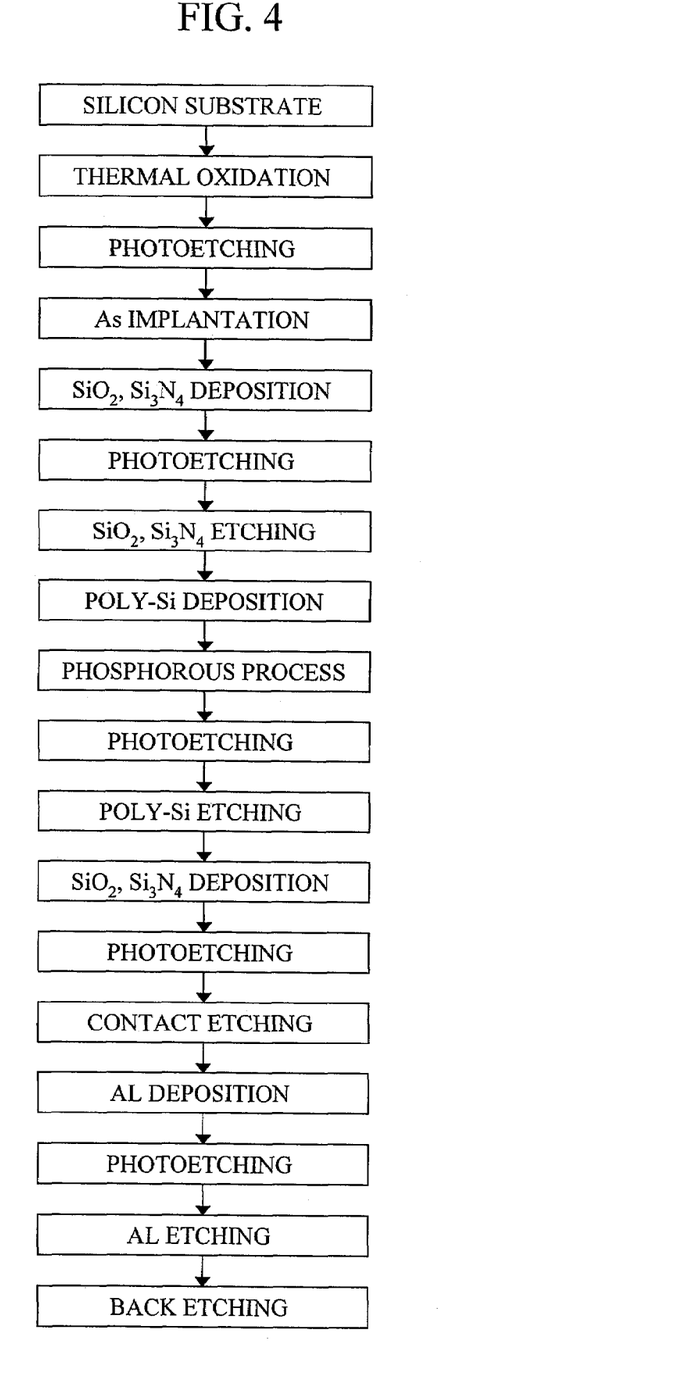
FIG. 4 shows a process chart for the detection element 1 of the thermal type flow rate measuring apparatus of the first embodiment.
Figure 5:
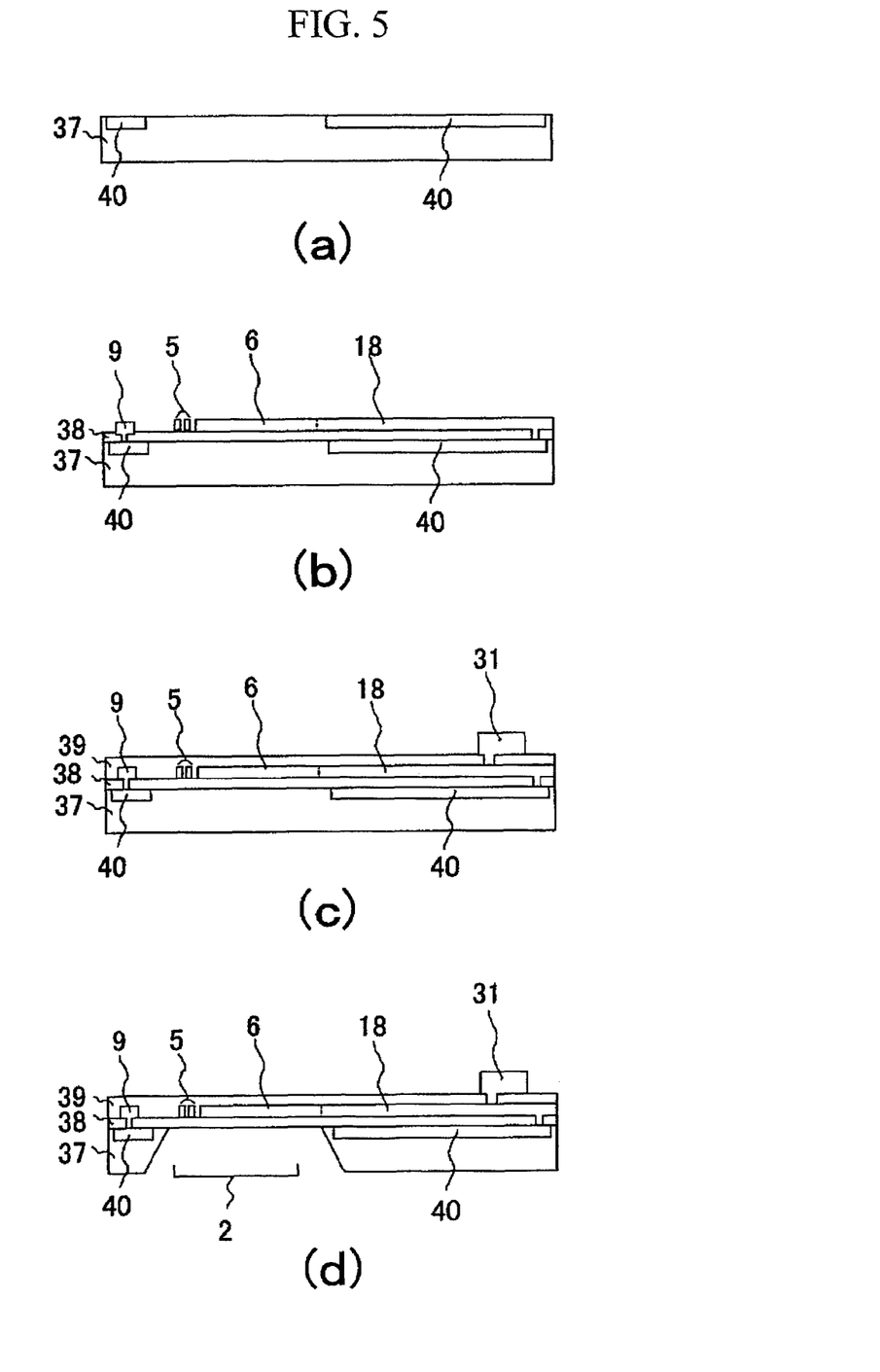
FIG. 5 shows cross sectional views of process steps of the detection element 1 of the thermal type flow rate measuring apparatus of the first embodiment.
Figure 6:
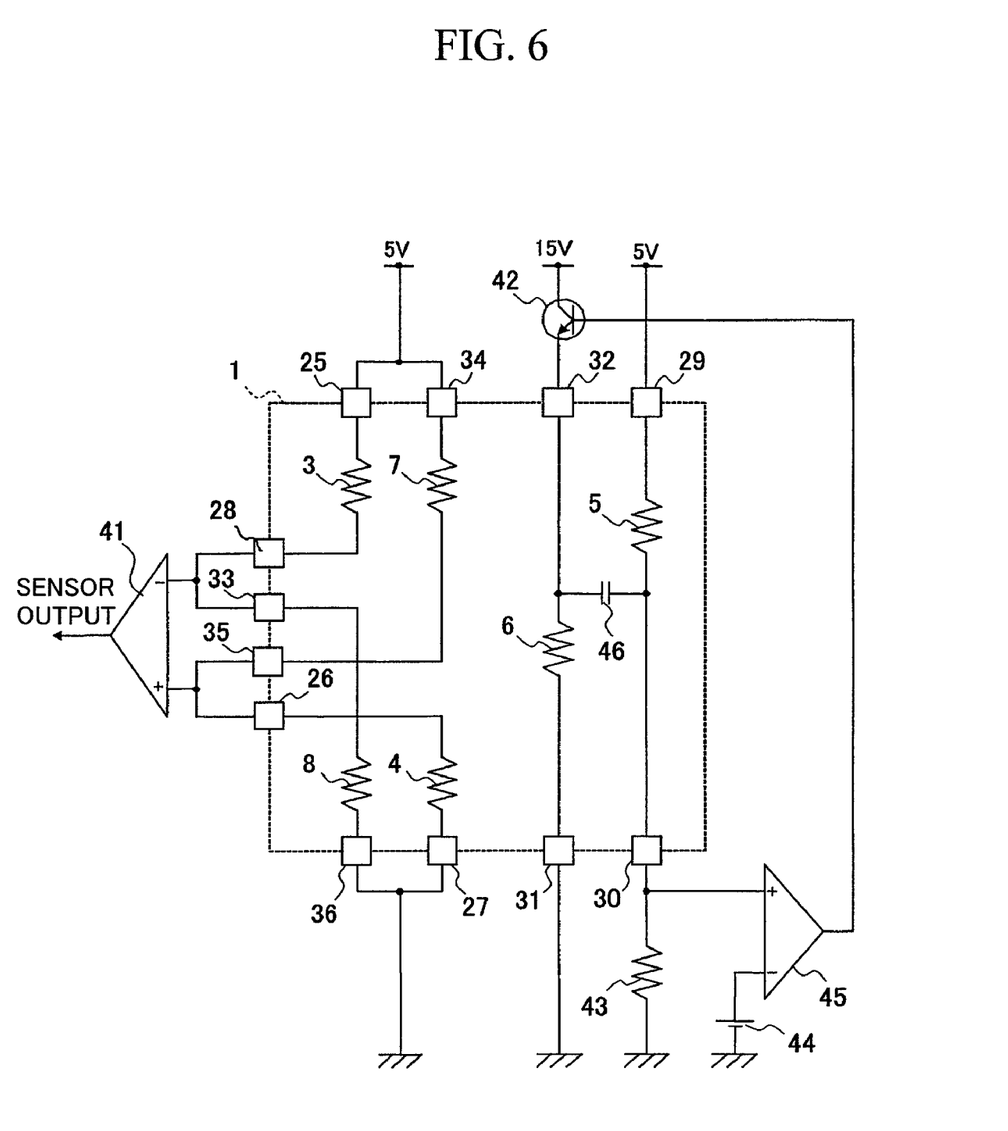
FIG. 6 shows a first drive circuit for the thermal type flow rate measuring apparatus of the first embodiment.
Figure 7:
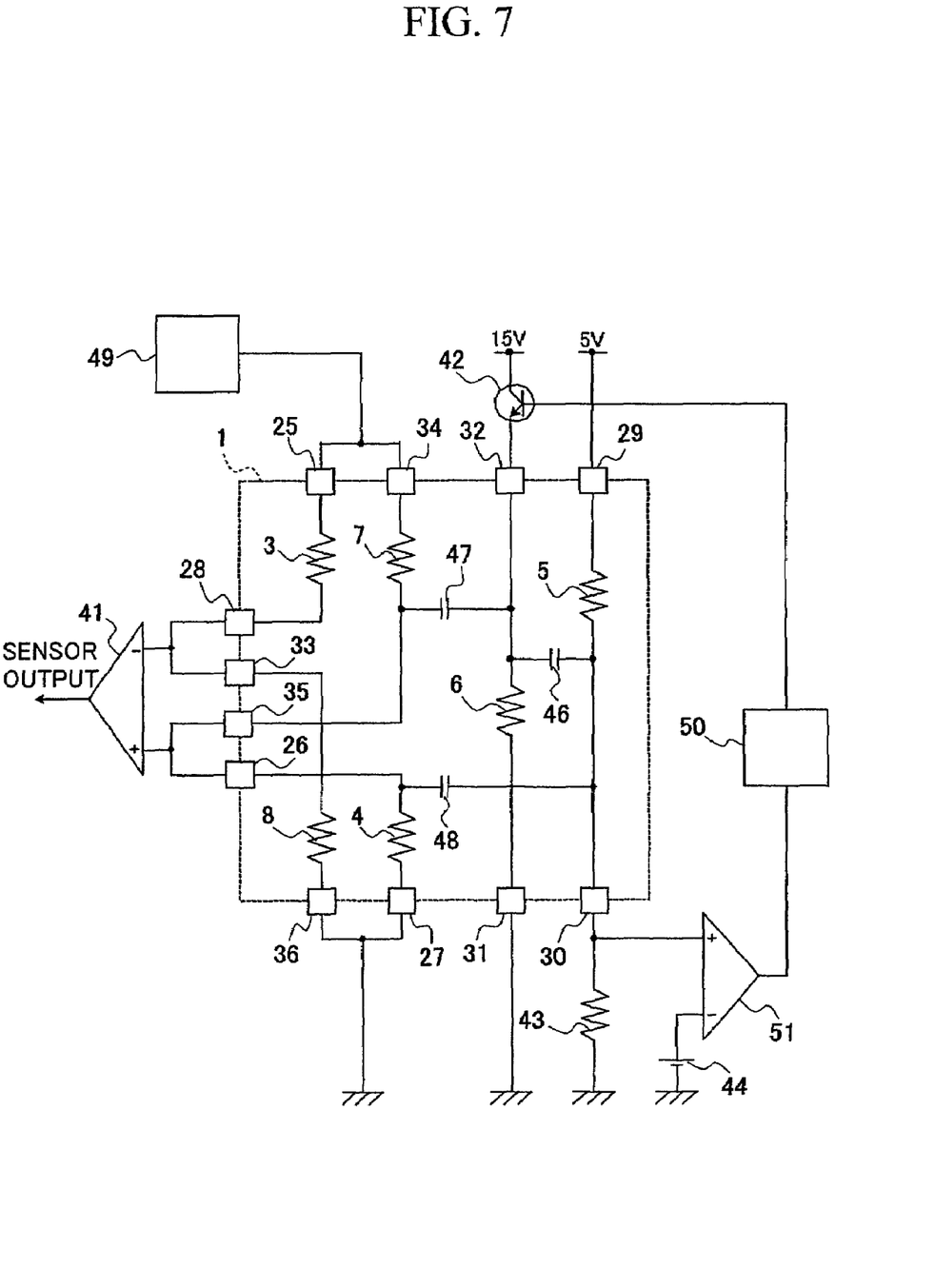
FIG. 7 shows a second drive circuit for the thermal type flow rate measuring apparatus of the first embodiment.

A thermal type flow rate measuring apparatus according to a first embodiment of the invention is described with reference to FIGS. 1, 2, 3, 4, 5, 6, and 7. FIG. 1 shows a plan view of a detection element 1 of the thermal type flow rate measuring apparatus of the first embodiment. FIG. 2 shows a cross section taken along line A-A' of the detection element 1 of the thermal type flow rate measuring apparatus of the first embodiment. FIG. 3 shows a plan view illustrating the layout of the diffusion layer 40 of the detection element 1 of the thermal type flow rate measuring apparatus of the first embodiment. FIG. 4 shows a process chart for the detection element 1 of the thermal type flow rate measuring apparatus of the first embodiment. FIG. 5 shows cross sections illustrating the process steps for the detection element 1 of the thermal type flow rate measuring apparatus of the first embodiment. FIG. 6 shows a first drive circuit of the thermal type flow rate measuring apparatus of the first embodiment. FIG. 7 shows a second drive circuit of the thermal type flow rate measuring apparatus of the first embodiment.

The structure of the detection element 1 of the present thermal type flow rate measuring apparatus is described with reference to FIGS. 1, 2, and 3.

The detection element 1 includes a planar substrate 37 made of a material having a good heat conductivity, such as silicon, ceramic, and the like. After an insulating film 38 is formed on the substrate 37, the substrate 37 is etched on its back surface to form a space under the insulating film 38, thereby forming a diaphragm (thin-walled part) 2. On the surface of the diaphragm 2, the following are formed: a heat-generating resistor 6 functioning as a heat-generating element that is heated to a predetermined temperature difference from the temperature of the flow of air to be measured; a heat-generating element temperature-detecting resistor 5 disposed near the heat-generating resistor 6 for detecting its temperature; and temperature-detecting resistors 3, 4, 7, and 8 disposed on both sides (upwind and downwind sides) of the heat-generating resistor 6 as temperature-detecting means. The heat-generating resistor 6 is a resistor made of polysilicon thin film, platinum thin film, nickel alloy thin film, or the like; it generates heat when electric current flows through it. The heat-generating element temperature-detecting resistor 5 and the temperature-detecting resistors 3, 4, 7, and 8 are also resistors made of polysilicon thin film, platinum thin film, nickel alloy thin film, or the like. By taking advantage of the change in the resistance values of these resistors depending on temperature, the temperature of the heat-generating element 6 can be detected with the heat-generating element temperature-detecting resistor 5, and the temperature on both sides (upwind and downwind) of the heat-generating resistor 6 can be detected with the temperature-detecting resistors 3, 4, 7, and 8. The heat-generating resistor 6 is connected, via wiring portions 18 and 24, to connecting terminals 31 and 32 for external electrical connection. The heat-generating element temperature-detecting resistor 5 is connected, via wiring portions 15 and 16, to connecting terminals 29 and 30 for external electrical connection. The temperature-detecting resistors 3, 4, 7, and 8 are connected, via wiring portions 10, 11, 12, 13, 19, 20, 21, and 22, to connecting terminals 25, 26, 27, 28, 33, 34, 35, and 36 for external electrical connection. A diffusion layer 40 is provided on the planar substrate 37 except for the areas of the diaphragm 2 and the peripheries of the planar substrate 37, as shown in FIG. 3, so as to decrease the resistance of the surface portion of the substrate. The diffusion layer 40 is electrically connected externally via the terminal 31 by contacts disposed on a wiring pattern 9. Between the wiring portion 18 and the wiring portion 16, a wiring pattern 17 having contacts connecting to the diffusion layer 40 is disposed, thereby providing a shield between the wiring portion 18 and the wiring portion 16. Between the wiring portion 13 and the wiring portion 15, a wiring pattern 14 having contacts connecting to the diffusion layer 40 is disposed, thereby providing a shield between the wiring portion 13 and the wiring portion 15. Between the wiring portion 22 and the wiring portion 24, a wiring pattern 23 having contacts connecting to the diffusion layer 40 is disposed, thereby providing a shield between the wiring portion 22 and the wiring portion 24. The heat-generating resistor 6, the heat-generating element temperature-detecting resistor 5, the temperature-detecting resistors 3, 4, 7, and 8, the wiring portions 10, 11, 12, 13, 15, 16, 18, 19, 20, 21, 22, and 24, and the wiring patterns 9, 14, 17, and 23 are covered with a protection film 39.

In the following, a process of fabrication of the detection element 1 of the present thermal type flow rate measuring apparatus is described with reference to FIGS. 4 and 5. In the present embodiment, the planar substrate 37 is a silicon substrate, and the heat-generating element 6, the heat-generating element temperature-detecting resistor 5, and the temperature-detecting resistors 3, 4, 7, and 8 are made of a polysilicon thin film. First, the planar substrate 37 (silicon substrate) is subjected to thermal oxidation, photoetching, and As (arsenic) implantation so as to form a diffusion layer 40 on the planar substrate 37, as shown in FIG. 5(a). Then, $SiO_2$ and $Si_3N_4$ deposition (silicon oxide film and silicon nitride film deposition), photoetching, $SiO_2$ and $Si_3N_4$ etching (silicon oxide film and silicon nitride film etching), poly-Si (polysilicon) deposition, phosphorus process, photoetching, and poly-Si (polysilicon) etching are carried out, so as to form the insulating film 38, the wiring pattern 9, the heat-generating element temperature-detecting resistor 5, the heat-generating resistor 6, and the wiring portion 18, as shown in FIG. 5(b). The diffusion layer 40 is electrically connected, via contacts formed (by $SiO_2$ and $Si_3N_4$ etching) in the insulating film 38, by the wiring pattern 9 (which is formed of polysilicon). Thereafter, $SiO_2$ and $Si_3N_4$ deposition (silicon oxide film and silicon nitride film deposition), photoetching, contact etching, AL (aluminum) deposition, photoetching, and AL (aluminum) etching are carried out, so as to form the protection film 39, the connecting terminal 31, and the like, as shown in FIG. 5(c). Finally, a back-etch is carried out to form the diaphragm 2 as shown in FIG. 5(d), thereby completing the detection element 1.

Hereafter, a drive circuit for the present thermal type flow rate measuring apparatus is described with reference to FIG. 6. This drive circuit is composed of the following components: a transistor 42 for driving the heat-generating resistor 6; a fixed resistor 43 connected in series with the heat-generating element temperature-detecting resistor 5; a differential amplifier 45 for amplifying the voltage at the connecting point of the heat-generating element temperature-detecting resistor 5 and the fixed resistor 43 (which voltage varies depending on the temperature of the heat-generating resistor 6 because the resistance value of the heat-generating element temperature-detecting resistor 5 varies as the temperature of the heat-generating resistor 6 changes) in comparison with the voltage of a reference voltage source 44, so as to drive the transistor 42; and a differential amplifier 41 for amplifying the voltage of a bridge circuit consisting of the temperature-detecting resistors 3, 4, 7, and 8. The capacitance 46 is the parasitic capacitance between the heat-generating element 6 and the heat-generating element temperature-detecting resistor 5.

In the drive circuit of the present embodiment, the voltage for driving the heat-generating resistor 6 is coupled via the capacitance 46 to the differential amplifier 45. Such coupling by way of the capacitance 46 acts as a positive feedback to the differential amplifier 45 and so adversely affects the stability of the temperature control system of the heat-generating resistor 6. As a result, the control rate of the heat-generating resistor 6 decreases and so the response characteristics of the flow rate measuring apparatus are adversely affected. Thus, it is necessary to reduce the value of the capacitance 46.

In the detection element 1 of the present embodiment, the heat-generating resistor 6 and the wiring portions 18 and 24 are made of the same material. Further, in order to reduce the heat due to the resistance of the wiring portions 18 and 24, the pattern widths of the wiring portions 18 and 24 are made significantly wider than the width of the heat-generating resistor 6. The heat-generating element temperature-detecting resistor 5 and the wiring portions 15 and 16 are also made of the same material. Furthermore, in view of the need to reduce the resistance value of the wiring portions 15 and 16 in order to decrease the sensitivity and error in the heat-generating element temperature-detecting resistor 5, the pattern widths of the wiring portions 15 and 16 are also made very wide. Consequently, the capacitance between the wiring portions 18 and 24 and the wiring portions 15 and 16 would become very large. In addition, in the aforementioned conventional example, since the planar substrate is comprised of an electrically conductive silicon substrate and the silicon substrate is used in a floating manner, the capacitance between the wiring portions 18 and 24 and the wiring portions 15 and 16 is made all the more larger. Thus, in the detection element 1 of the present embodiment, the wiring pattern 17 connected to a constant potential (ground potential) is disposed between the wires 16 and 18 so as to reduce the capacitance between the wiring portions 18 and 24 and the wiring portions 15 and 16. Furthermore, the width of the wiring pattern 17 is made greater than the thickness of the planar substrate 37 so as to enhance its shield effect. The planar substrate 37 is also provided with the diffusion layer 40, with which the wiring pattern 17 is connected via a plurality of contacts. In this way, the impedance of the wiring pattern 17 is reduced and its shield effect is enhanced. Further, the diffusion layer 40 disposed under the wiring portions 18 and 24 and the wiring portions 15 and 16 also helps enhance the shield effect between the wiring portions 18 and 24 and the wiring portions 15 and 16.

In the following, a second example of the drive circuit for the thermal type flow rate measuring apparatus of the present embodiment is described with reference to FIG. 7. This drive circuit is composed of the following: a transistor 42 for driving the heat-generating resistor 6; a fixed resistor 43 connected in series with the heat-generating element temperature-detecting resistor 5; a comparator 51 for comparing the voltage at the connection point of the heat-generating element temperature-detecting resistor 5 and the fixed resistor 43 (which voltage varies depending on the temperature of the heat-generating resistor 6 because the resistance value of the heat-generating element temperature-detecting resistor 5 varies as the temperature of the heat-generating resistor 6 changes) with the voltage of the reference voltage source 44; a pulse width modulation circuit 50 for pulse-driving the transistor 42 in accordance with the output of the comparator 51; a pulse generator 49 for applying a pulsed voltage to the bridge circuit consisting of the temperature-detecting resistors 3, 4, 7, and 8; and a differential amplifier 41 for amplifying the output voltage of the bridge circuit. Capacitance 46 is the parasitic capacitance between the heat-generating resistor 6 and the heat-generating element temperature-detecting resistor 5; capacitance 47 is the parasitic capacitance between the heat-generating resistor 6 and the temperature-detecting resistor 7; and capacitance 48 is the parasitic capacitance between the temperature-detecting resistor 4 and the heat-generating element temperature-detecting resistor 5.

Thus, in the drive circuit of the present embodiment, the voltage to drive the heat-generating resistor 6 is coupled via the capacitance 46 to the comparator 51. Such coupling by way of the capacitance 46 causes noise in the comparator 51 when the heat-generating resistor 6 is driven with a pulsed voltage, thereby destabilizing the temperature control of the heat-generating resistor 6. It is therefore necessary to reduce the value of the capacitance 46. Further, the voltage to drive the heat-generating resistor 6 is coupled, via the capacitance 47, to the differential amplifier 41. Such coupling causes noise in the differential amplifier 41 when the heat-generating resistor 6 is driven with a pulsed voltage, thereby causing an error in the flow rate detection signal. Thus, it is necessary to reduce the value of the capacitance 47. Furthermore, the capacitance 48 couples the pulsed voltage to drive the temperature-detecting resistors 3, 4, 7, and 8 with the comparator 51. Such coupling by the capacitance 48 produces noise in the comparator 51 and thereby reduces the accuracy of detection of the temperature of the heat-generating resistor 6. Thus, it is also necessary to reduce the value of the capacitance 48. In the detection element 1 of the present embodiment, the heat-generating resistor 6 and the wiring portions 18 and 24 are made of the same material. In order to reduce the heat produced by the resistance of the wiring portions 18 and 24, the pattern widths of the wiring portions 18 and 24 are made significantly wider than the width of the heat-generating resistor 6. The temperature-detecting resistors 3, 4, 7, and 8 and the wiring portions 10, 11, 12, 13, 19, 20, 21, and 22 are also made of the same material. In view of the need to reduce the resistance values of the wiring portions 10, 11, 12, 13, 19, 20, 21, and 22 in order to decrease the sensitivity and error in the temperature-detecting resistors 3, 4, 7, and 8, the pattern widths of the wiring portions 10, 11, 12, 13, 19, 20, 21, and 22 are made very large. As a result, the capacitance between the wiring portions 18 and 24 and the wiring portions 10, 11, 12, 13, 19, 20, 21, and 22 would become very large. Therefore, in the detection element 1 of the present embodiment, the wiring pattern 14 connected to the ground voltage is disposed between the wiring portions 10, 11, 12, and 13 and the wiring portions 15 and 16, so as to reduce the capacitance between the wiring portions 10, 11, 12, and 13 and the wiring portions 15 and 16. Further, between the wiring portions 19, 20, 21, and 22 and the wiring portions 18 and 24, there is connected the wiring pattern 23 which is connected to ground voltage, whereby the capacitance between the wiring portions 19, 20, 21, and 22 and the wiring portions 18 and 24 is reduced. The widths of the wiring patterns 14 and 23 are also made greater than the thickness of the planar substrate 37 so as to enhance their shield effect. The planar substrate 37 is further provided with the diffusion layer 40, which is connected to the wiring patterns 14 and 23 via a plurality of contacts. In this way, the impedance of the wiring patterns 14 and 23 is reduced, thereby enhancing their shield effect. The shield effects are further enhanced by the diffusion layer 40, which is connected to ground potential, disposed under the wiring portions 10, 11, 12, 13, 19, 20, 21, 22, 15, and 16.

In the foregoing embodiment, the planar substrate 37 may be of P type and the diffusion layer 40 may be of N type and they may be insulated from each other.

In the foregoing, the planar substrate 37 has been described as being provided with the diffusion layer 40. However, this is not to be taken in any way as limiting the invention. For example, the diffusion layer may be dispensed with and the wiring patterns may be directly electrically connected to the planar substrate with contacts disposed on the wiring patterns; such structure is also included in the scope of the invention.

What is claimed is:

1. A thermal type flow rate measuring apparatus, comprising:
- a heat-generating element disposed in the flow of a fluid that generates heat when electric current flows therethrough;
- first and second temperature-detecting elements disposed on both sides of the heat-generating element along the flow of the fluid;
- a heat-generating element connecting terminal electrically connected to the heat-generating element;
- first and second temperature-detecting element connecting terminals electrically connected to the first and second temperature-detecting elements;
- a heat-generating element wiring portion electrically connecting the heat-generating element and the heat-generating element connecting terminal; and
- first and second temperature-detecting element wiring portions electrically connecting the first and second temperature-detecting elements and the first and second temperature-detecting element connecting terminals, respectively, the apparatus further comprising:
- a wiring pattern disposed between the heat-generating element wiring portion and the first and second temperature-detecting element wiring portions, wherein the wiring pattern is held at a constant potential;
- a heat-generating element temperature-detecting element disposed near the heat-generating element for detecting the temperature of the heat-generating element;
- a heat-generating element temperature-detecting element connecting terminal electrically connected with the heat-generating element temperature-detecting element;
- a heat-generating element temperature-detecting element wiring portion electrically connecting the heat-generating element temperature-detecting element with the heat-generating element temperature-detecting element connecting terminal; and
- a wiring pattern disposed between the heat-generating element wiring portion and the heat-generating element temperature-detecting element wiring portion, wherein the wiring pattern is held at a constant potential.

2. The thermal type flow rate measuring apparatus according to claim 1, comprising:
- a wiring pattern disposed between the heat-generating element temperature-detecting element wiring portion and the first and second temperature-detecting element wiring portions, wherein the wiring pattern is held at a constant potential.

3. The thermal type flow rate measuring apparatus according to claim 1, comprising:
- a thin-film layer of which the heat-generating element and the heat-generating element wiring portion are made; and
- an electrically conductive planar substrate on which the thin-film layer is fixed via an insulating layer,
- wherein the width of the wiring pattern is greater than the thickness of the planar substrate.

4. The thermal type flow rate measuring apparatus according to claim 3, wherein the wiring pattern is electrically connected with the planar substrate.

5. The thermal type flow rate measuring apparatus according to claim 4, comprising a diffusion layer formed on the planar substrate so as to reduce the resistance of the planar substrate.

6. The thermal type flow rate measuring apparatus according to claim 3, wherein the wiring pattern comprises successively disposed connecting portions that are electrically connected with the planar substrate.

* * * * *